(12) United States Patent
Kuckelkorn (10) Patent No.: US 9,404,674 B2
(45) Date of Patent: Aug. 2, 2016

(54) ABSORBER TUBE

(75) Inventor: Thomas Kuckelkorn, Jena (DE)

(73) Assignee: SCHOTT AG, Mainz (DE)

( * ) Notice: Subject to any disclaimer, the term of this patent is extended or adjusted under 35 U.S.C. 154(b) by 731 days.

(21) Appl. No.: 13/513,688

(22) PCT Filed: Dec. 1, 2010

(86) PCT No.: PCT/EP2010/068640
§ 371 (c)(1),
(2), (4) Date: Jun. 4, 2012

(87) PCT Pub. No.: WO2011/067289
PCT Pub. Date: Jun. 9, 2011

(65) Prior Publication Data
US 2013/0228166 A1    Sep. 5, 2013

(30) Foreign Application Priority Data
Dec. 4, 2009    (DE) .................. 10 2009 047 548

(51) Int. Cl.
*F24J 2/05*    (2006.01)
*F24J 2/07*    (2006.01)
(Continued)

(52) U.S. Cl.
CPC ............ *F24J 2/055* (2013.01); *B21D 53/02* (2013.01); *F04B 37/02* (2013.01); *F24J 2/07* (2013.01); *F24J 2/4612* (2013.01); *F24J 2/4616* (2013.01); *F24J 2/4636* (2013.01);
(Continued)

(58) Field of Classification Search
CPC .............. F24J 2/05; F24J 2/055; F24J 2/4616
USPC ................................ 126/652–654
See application file for complete search history.

(56) References Cited

U.S. PATENT DOCUMENTS 3,379,208 A * 4/1968 Alleaume .................. 137/263
3,613,773 A * 10/1971 Hall et al. ................. 165/273
(Continued)

FOREIGN PATENT DOCUMENTS

CN    1707199 A    12/2005
CN    1862143 A    11/2006
(Continued)

OTHER PUBLICATIONS

International Search Report dated Feb. 1, 2012 corresponding to International Patent Application No. PCT/EP2010/068640.
(Continued)

*Primary Examiner* — Jorge Pereiro
(74) *Attorney, Agent, or Firm* — Ohlandt, Greeley, Ruggiero & Perle, LLP (57) ABSTRACT

An absorber tube for solar collectors is provided. The absorber tube comprises a metal tube for carrying and heating a heat transfer medium, a sleeve tube enclosing the metal tube for forming an annular space that can be evacuated, a first container disposed in the annular space and filled with protective gas, an outer ring, and a transition element enclosing the metal tube for sealing off the annular space. The first container includes an outlet opening closed by a closure material, which releases the outlet opening under external actuation for introducing the protective gas into the annular space. The external actuation is applied by an opening unit that is activated for releasing the outlet openings. The first container is fixed in the annular space by a retaining device, which is on the outer ring and/or on the transition element.

21 Claims, 6 Drawing Sheets

(51) Int. Cl.
*F24J 2/46* (2006.01)
*F04B 37/02* (2006.01)
*B21D 53/02* (2006.01)

(52) U.S. Cl.
CPC ......... *F24J 2002/4681* (2013.01); *Y02E 10/41* (2013.01); *Y02E 10/44* (2013.01); *Y02E 10/46* (2013.01); *Y10T 29/49355* (2015.01); *Y10T 29/53* (2015.01)

(56) References Cited

U.S. PATENT DOCUMENTS

| | | | |
|---|---|---|---|
| 3,968,786 | A | 7/1976 | Spielberg |
| 4,508,104 | A * | 4/1985 | Takeuchi et al. ............ 126/653 |
| 4,523,578 | A | 6/1985 | Sabet |
| 5,177,977 | A * | 1/1993 | Larsen ........................ 62/235.1 |
| 7,552,726 | B2 * | 6/2009 | Kuckelkorn et al. ......... 126/653 |
| 7,806,115 | B2 * | 10/2010 | Kuckelkorn et al. ......... 126/654 |
| 8,710,361 | B2 * | 4/2014 | Cumpston et al. ........... 136/259 |
| 2007/0034204 | A1 | 2/2007 | Kuckelkorn et al. |
| 2007/0235024 | A1 | 10/2007 | Kuckelkorn et al. |
| 2008/0087277 | A1 * | 4/2008 | Schweyher ................. 126/694 |
| 2010/0126499 | A1 * | 5/2010 | Lu ............................... 126/651 |
| 2010/0242951 | A1 * | 9/2010 | Soucy .......................... 126/675 |
| 2012/0024715 | A1 * | 2/2012 | Glatzmaier .................. 205/337 |

FOREIGN PATENT DOCUMENTS

| | | | |
|---|---|---|---|
| CN | 1971166 | A | 5/2007 |
| CN | 101270923 | A * | 9/2008 |
| CN | 201122006 | | 9/2008 |
| DE | 69309453 | T2 | 7/1997 |
| DE | 19840101 | A1 | 3/2000 |
| DE | 10231467 | | 2/2004 |
| DE | 102005022183 | | 8/2006 |
| DE | 102005057276 | | 7/2007 |
| WO | 2004/063640 | | 7/2004 |
| WO | 2011/039281 | | 4/2011 |

OTHER PUBLICATIONS

Written Opinion dated Feb. 1, 2012 corresponding to International Patent Application No. PCT/EP2010/068640.
Japanese Office Action dated Aug. 19, 2014 corresponding to Japanese Patent Application No. 2012-541489 with English translation, 6 pages.
International Preliminary Report on Patentability dated Jun. 14, 2012 corresponding to International Patent Application No. PCT/EP2010/068640.
English translation of the Written Opinion of the International Searching Authority dated Feb. 1, 2012 corresponding to International Patent Application No. PCT/EP2010/068640, 10 pages.
DIN 17745 "Wrought nickel-iron allows", Sep. 2002, 7 pages.

* cited by examiner

ABSORBER TUBE

The present invention relates to an absorber tube, in particular for solar collectors in solar thermal power plants, having at least one collector mirror, comprising a metal tube for conducting and heating a heat transfer medium, a sleeve tube enclosing the metal tube for forming an annular space that can be evacuated, and a first container disposed in the annular space and filled with protective gas, wherein the first container has an outlet opening that is closed by a closure material, which frees up the outlet opening upon external activation for introducing the protective gas into the annular space, wherein the external activation can be applied by an opening unit that can be activated for freeing up the outlet openings, and an outer ring and a transition element enclosing the metal tube for sealing off the annular space. In addition, the invention relates to a method for introducing protective gas into an annular space of an absorber tube.

Solar collectors, for example, can be equipped with a parabolic mirror, also called a collector mirror, and are used in so-called parabolic trough power plants. In known parabolic trough power plants, a thermal oil that can be heated up to approximately 400° C. by means of solar radiation reflected from the parabolic mirrors and focused onto the absorber pipe is used as the heat transfer medium. The heated heat transfer medium is conducted through the metal tube and introduced into a vaporization process, by means of which the heat energy is transformed into electrical energy.

The absorber tube is thus usually composed of a metal tube, which has a radiation-absorbing layer and a sleeve tube made of glass, which surrounds the metal tube. The annular space formed in this way serves for the purpose of minimizing the heat losses on the outer surface of the metal tube and thus increasing the energy yield. The individual absorber tubes are welded together approximately at up to 4 m lengths and are formed into solar field loops with a total length of up to 200 m. Absorber tubes of this type are known, for example, from DE 102 31 467 B4.

With increasing aging, the thermal oil used as the heat transfer medium releases free hydrogen that is dissolved in the thermal oil. The quantity of dissolved hydrogen, on the one hand, depends on the thermal oil used and on the operating conditions of the oil circuit, but on the other hand, also depends on the amount of water that comes into contact with the thermal oil. In particular, a contact with water can frequently occur due to leakages in heat exchangers. As a consequence of permeation through the metal tube, the hydrogen being released gains access to the evacuated annular space, the permeation rate also increasing with increasing operating temperature of the metal tube. As a consequence of this, the pressure in the annular space also increases, which has as a consequence an increase in heat conduction through the annular space, which in turn leads to heat losses and to a lower efficiency of the absorber tube or the solar collector.

In order to at least reduce the pressure increase in the annular space and thus to prolong the service life of the absorber tube, the hydrogen that has entered into the annular space can be bound by getter materials. The absorption capacity of the getter materials is limited, however. After reaching the maximum loading capacity, the pressure in the annular space increases until it is in equilibrium with the partial pressure of the free hydrogen from the thermal oil that has gained access to the annular space. Due to the hydrogen, an increased heat conduction arises in the annular space with the above-named disadvantageous consequences for the efficiency of the solar collector.

Absorber tubes, which are provided with getter materials in the annular space, are known, for example, from WO 2004/063640 A1. In the device described therein, the getter material is found in getter bars that are directly subjected to reflected solar radiation and are thus heated. Since the getter bars in the evacuated annular space are nearly thermally separated from the metal tube and from the sleeve tube, the temperature of the bars and thus also that of the getter material greatly fluctuates, for which reason the absorption capacity of the getter material also fluctuates, so that undesired, irregular pressure ratios occur in the annular space.

An absorber tube is known from DE 10 2005 057 276 B3, in which noble gas is introduced into the annular space when the capacity of the getter material is exhausted. Many noble gases have a small heat conductivity, so that the heat conduction through the annular space can be reduced despite the presence of free hydrogen; therefore, so that the efficiency of the solar collector with introduced noble gas is reduced only by approximately 1% when compared with the evacuated metal tube. The embodiments of the noble-gas container described in DE 10 2005 057 276 B3 are essentially only of a theoretical nature, since they can be produced only in a very complex manner technically and thus are hardly transferable in practice. In particular, this step does not contain practicable instructions as to how the noble-gas containers can be configured and disposed; therefore, they are simple to open at any given point in time. Further, there is no information on the arrangement of the getter material in the annular space relative to the noble-gas container.

The object of the present invention is thus to further develop the absorber tubes known from the prior art, so that they can be manufactured more simply without limiting their functionality, in particular without reducing their service life. Further, the introduction of noble gases into the annular space will be made possible in a simple way.

The object is achieved in that the first container is fixed in place in the annular space by means of a retaining device, the retaining device being disposed on the transition element.

External activation will be understood here in that it is produced outside the absorber tube or at least outside the annular space and the metal tube and is not produced by the operation of the absorber tube. Such an external activation can be of a mechanical type, for example. The arrangement of the retaining device is preferably selected in such a way that the external activation is transferred by the retaining device.

The opening unit can be provided in the form of a push button, which is actively connected with the outlet opening via the retaining device. If this push button is actuated, for example, by the maintenance personnel of the solar collector, the outlet opening is broken open and freed up, so that protective gas is introduced into the annular space.

The external activation is preferably a heat activation. In this embodiment, the maintenance personnel can heat the absorber tube in the vicinity of the outlet openings, for example on the outer ring, by means of a mobile heating means, so that the closure material fuses under the heat activation and the outlet opening is freed up. The effective connection of the retaining device in this case is not only of a mechanical type, but also of a heat-conducting type. Preferably, the retaining device in this case is composed of a heat-conducting material, for example a metal. It is advantageous in this embodiment that the opening unit does not require additional components and that the mobile heating means can be used for all absorber tubes of the solar-thermal power plant.

Preferably, the outlet opening can be heated inductively and the opening unit comprises an electrical coil and a metal disk or washer. In this embodiment, the outlet openings can be opened automatically and the protective gas can be introduced automatically into the annular space, since the electrical coil can be connected to a control unit that activates the electrical coil when pre-determinable events occur. It is therefore not necessary that the outlet openings are opened by means of the maintenance personnel, so that personnel costs for the operation of the plant can be reduced. In this case, the material from which the retaining device is manufactured does not play a role.

Advantageously, the retaining device comprises one or more solder points composed of a metal solder. Solder points can be produced very simply and inexpensively. The metal solder is selected so that it does not fuse at the temperatures prevailing during operation of the solar collector. A hard solder can be used here, which fuses only starting from temperatures over 400° C.

The closure material is preferably composed of metal solder. The metal solder can be the same as that used for solder points in the retaining device. In this way, the variety of materials and the probability of manufacturing errors during the production of absorber tubes as a consequence of a material mixup will be reduced.

In a preferred embodiment of the absorber tube according to the invention, at least one of the solder points also closes the outlet opening for fixing the first container in place in the annular space. In this case, one of the solder points has two functions: On the one hand, it has a retaining function, since it fixes the first container in place in its position in the annular space. On the other hand, it has a closure function, since the solder also simultaneously represents the closure material for the outlet openings.

A particularly preferred configuration of the absorber tube according to the invention is characterized by a second container filled with a getter material for binding free hydrogen and disposed in the annular space. The solution according to the invention with two containers, one of which is filled with the getter material and the other with protective gas, is advantageous from the point of view of technical manufacture, since the two containers can be premounted in the finished state and filled before they are inserted in the annular space.

The second container is preferably fastened in the annular space by means of the retaining device. Depending on the arrangement of the first and second containers in each case, it can be determined whether both containers or only one of the containers will be fixed in place with the retaining device. Special support devices, such as e.g., getter bars, as they are described in WO 2004/063640 A1, will not be necessary.

In one advantageous embodiment, the outer ring has one or more projections projecting into the annular space for positioning the first and/or the second container. The transition element and the outer ring are components of expansion-equilibrating units known from the prior art, with which the different expansions of the sleeve tube and of the metal tube are equilibrated during the operation of the absorber tube, so that the annular space remains closed in a gas-tight manner.

Alternatively, one of the projections projects into the outlet opening and is provided with a marking for identifying the outlet opening. Here also, the projections can be configured so that only one of the projections fits into the outlet opening. The outlet opening is closed by means of the metal solder and the corresponding container is simultaneously fastened to the outer ring. The marking of the outlet opening can be provided, for example, by an appropriate recess on the outside of the outer ring, so that the maintenance personnel know at which site the heating device must be placed for opening the closure material.

The absorber tube according to the invention is advantageously further developed in such a way that the first container and the second container are configured annularly and surround the metal tube. The annular configuration of the container, on the one hand, provides that the getter material is distributed uniformly in the annular space and thus is equally well accessible and can absorb the free hydrogen in a barrier-free manner, and on the other hand, that each of the containers forms a unit that is closed in and of itself, which facilitates its incorporation and in particular its positioning in the annular space.

Preferably, the first container has a first surface and the second container has a second surface, on which the first and the second containers can be connected to form one component. The two containers can be joined together in the desired position relative to one another prior to insertion into the annular space, so that they can be jointly introduced into the annular space in one working step. In this embodiment, the production of the absorber tube according to the invention is further simplified.

In a preferred further development, in which the absorber tube has a longitudinal axis, the first surface and the second surface extend radially to the longitudinal axis, i.e., the normal vectors of the first surface and those of the second surface run parallel to the longitudinal axis. In this enhancement, the two containers can be joined particularly simply with one another from the point of view of technical manufacture, and it is particularly possible to provide the two containers with identical dimensions, so that only one container shape needs to be manufactured, which further simplifies manufacturing costs. Here, care need only be taken that the container for the protective gas must be closed in a gas-tight manner, whereas the container for the getter material must be configured so that the released hydrogen can well be stored on the getter material in the annular space.

In addition, a preferred embodiment of the absorber tube according to the invention is characterized in that the first surface and the second surface extend coaxially to the longitudinal axis, i.e., the normal vectors of the first surface and the second surface run perpendicular to the longitudinal axis. In this embodiment, for example, the first cup-form container filled with the protective gas can be inserted into the second container filled with the getter material. Since the two containers in this embodiment have different volumes, this circumstance can be utilized in order to introduce more getter material into the annular space, for example, whereby the absorption capacity for free hydrogen is increased and thus the service life of the absorber tube is also increased.

In an advantageous embodiment of the absorber tube according to the invention, the first container is configured as a first ring segment and the second container as a second ring segment, and these can be joined together to form a closed ring. It is also possible here to adapt the ratio of the volume of the first container to the volume of the second container, via the size of the ring segment, to the specific features of the respective absorber tube, for example, in order to introduce more getter material into the annular space. If it should be established that a larger volume of protective gas would be advantageous, this can also be considered in a structurally simple way.

A preferred embodiment of the present invention is characterized in that the first container has one or more first ring segments and the second container has one or more second ring segments, which can be fixed in place separately from one another in the annular space. Neither the first or the second ring segments nor the first and the second containers are joined one under the other in this embodiment. Both the getter material as well as the noble gas can thus be distributed onto several ring segments. In this way, the number of ring segments that are filled with the getter material need not be equal to the number of ring segments that are filled with noble gas. A more flexible arrangement is made possible; further, the required quantities of getter material and noble gas can be adapted simply to the respective case of application.

The first ring segment and the second ring segment are preferably configured as half rings. In this embodiment, the ring segments can be produced in a particularly simple way by central separation of a closed ring, so that the manufacture can be set up inexpensively here and without a great many rejects.

In a particularly preferred embodiment, in which the absorber tube has one half facing the collector mirror and one half turned away from the collector mirror, the second container is disposed in the half turned away from the collector mirror. In the half of the absorber tube turned away from the collector, lower temperatures prevail than in the half facing the collector mirror during operation of the solar collector, due to shading of the metal tube. The absorption capacity of the getter material for free hydrogen increases with decreasing temperature. The arrangement of the second container in the half turned away from the collector mirror therefore leads to the circumstance that the annular space can be kept free of free hydrogen for a longer time, so that the pressure in the annular space and thus the heat conduction through the annular space only increases later. Consequently, the solar collector can be operated for a longer time with maximum efficiency or the service life of the absorber tube increases.

By means of the projections, the position of the container in the annular space can be established in a simple way during the manufacture, so that, for example, it is assured that the second container is also found in the half of the absorber tube turned away from the collector mirror. For this purpose, the containers may have corresponding recesses that are configured so that one recess is adapted to fit only one projection, so that the arrangement of the first and the second containers is established unequivocally relative to the outer ring.

Preferably, the transition element has a first region with a first diameter and a second region with a second diameter. The transition element is usually welded to the outer ring. The input of heat, which is necessary for welding, causes the transition element to arch outwardly. The reason for this is the lengthwise thermal expansion of the transition element. This has the consequence that the connection between the transition element and the sleeve tube is under load and may be damaged. The transition element is stiffened by means of the two different diameters, so that the loads on the connection with the sleeve tube are reduced during welding. The connection is thus protected and not damaged. The outer ring is configured so that it can take up the lengthwise expansion as a consequence of the heat input without problem.

Preferably, the outer ring is composed of stainless steel and the transition element is composed of kovar. Kovar is an iron-nickel-cobalt alloy. The heat expansion coefficient of the kovar used can be adapted to that of the glass used for the sleeve tube, so that the lengthwise expansions caused by the evolution of heat do not adversely affect one another both during the operation of the solar collector as well as in the manufacture of the absorber tube when the transition element is welded to the outer ring. The use of stainless steel for the outer ring simplifies welding with the spring bellows. Kovar is also designated 1.3981 according to DIN 17745.

Another aspect of the present invention relates to a device for introducing protective gas into an annular space of an absorber tube, comprising an absorber tube as described above, a temperature measuring unit for determining the temperature value of a sleeve tube, a comparison unit for comparing the temperature value of the sleeve tube that has been determined with a selectable critical temperature value, and an opening unit that can be activated by the comparison unit for freeing up the outlet openings for introducing protective gas into the annular space.

With this device, it is possible to automatically monitor the solar collectors and in particular, to conduct the introduction of the protective gas into the annular space when specific conditions are fulfilled or are no longer fulfilled.

In this case, one condition could be that the temperature value of the sleeve tube exceeds a critical value that can be chosen. It this condition occurs, it is a sign that heat conduction through the annular space has increased and thus there are heat losses on the sleeve tube. Consequently, the protective gas should now be introduced into the annular space in order to again minimize the heat losses.

Temperature measuring units can be provided in the form of temperature sensors introduced on the sleeve tube, or, however, in the form of thermal imaging cameras. In particular, thermal imaging cameras have the advantage that the temperature of a plurality of sleeve tubes can be monitored with a thermal imaging camera without needing to introduce a separate temperature sensor on each sleeve tube and having to connect it to the comparison unit. The images supplied by the thermal imaging camera can be interpreted with special image analysis software, so that the temperature values detected for all sleeve tubes can be determined and introduced into the comparison unit. The comparison unit can carry out a comparison between the determined temperature value and the critical temperature value with this information for each sleeve tube and, depending on the result of the comparison in each case, can activate the opening unit to free up the outlet openings. With this device, it is assured that the absorber tubes are continually monitored, without necessitating maintenance personnel for this.

It is further assured that the protective gas is introduced into the annular space into all absorber tubes under the same conditions, so that the solar collectors are not operated over a longer period of time unnecessarily below their intrinsically possible obtainable efficiency.

Another aspect of this invention relates to a method for introducing protective gas into an annular space of an absorber tube, comprising the following steps:

Determining the temperature value of the sleeve tube by means of a temperature measuring unit, Comparing the temperature value of the sleeve tube that has been determined with a selectable critical temperature value by means of a comparison unit, and Activating an opening unit and freeing up the outlet openings and introducing protective gas into the annular space for the case when the determined temperature value exceeds the critical temperature value.

The method according to the invention is preferably conducted in the indicated sequence, but other sequences are also conceivable. The advantages of this method coincide with those that were discussed for the corresponding device according to the invention for introducing protective gas into an annular space of an absorber tube.

Further, an additional aspect relates to a solar collector, comprising a collector mirror and an absorber tube according to one of claims 1 to 19. Another embodiment of the solar collector according to the invention additionally comprises a device for introducing protective gas into an annular space of the absorber tube according to claim 20.

The invention will now be described in detail based on preferred examples of embodiment with reference to the figures.

Herein.

Figure 1:
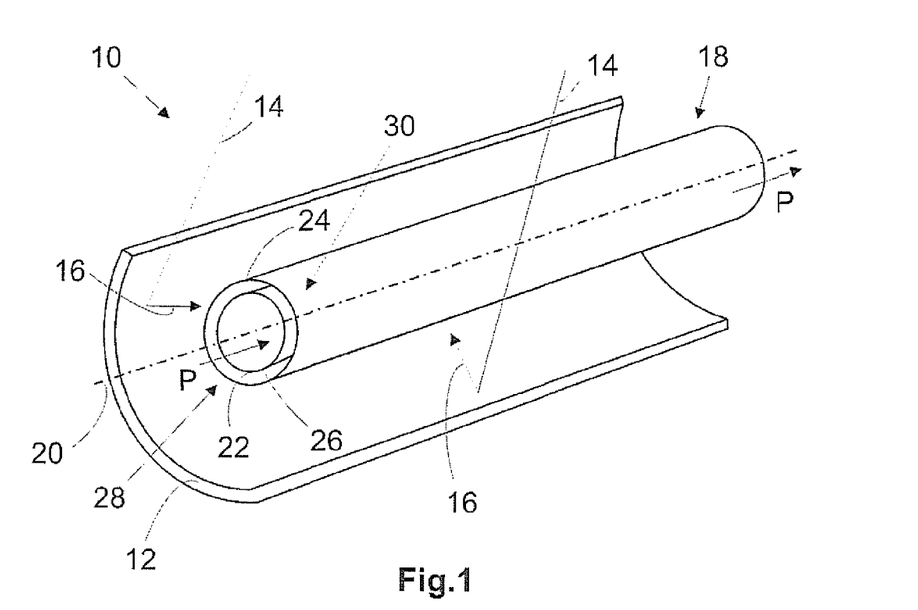
FIG. 1 shows a schematic representation of a solar collector.

A solar collector 10 of the known type is shown in FIG. 1. Solar collector 10 comprises a collector mirror 12, which reflects solar irradiation 14 and directs reflected solar irradiation 16 onto an absorber tube 18. Collector mirror 12 is configured in trough shape, so that it brings about a focusing of the reflected solar radiation along a focal line through which runs a longitudinal axis 20 of absorber tube 18.

Absorber tube 18 has a metal tube 22 and a sleeve tube 24. Metal tube 22 is coated with a radiation-absorbing layer and a heat transfer medium flows through it. Sleeve tube 24 surrounds metal tube 22, so that an annular space 26 is formed between metal tube 22 and sleeve tube 24. Sleeve tube 24 is typically composed of glass. Based on the trough-shaped configuration of collector mirror 12, absorber tube 18 can be divided into one half 28 facing collector mirror 12 and one half 30 turned away from it.

The flow direction of the heat transfer medium is indicated by the arrow P. By flowing through metal tube 22, the heat transfer medium will be heated by reflected solar radiation 16. The temperature that can be reached amounts to approximately 400° C. The heated heat transfer medium is introduced into a process that is not shown in more detail here, in which electrical energy is obtained. Half 30 of absorber tube 18, which is turned away from collector mirror 12, is cooled by mixed convection, thus by natural convection, and by forced convection due to wind, for example, which leads to heat losses and thus adversely affects the heating process of the heat transfer medium. Thus, one attempts to reduce the heat conduction from metal tube 22 outwardly as much as possible, which is carried out by means of the annular space 26 formed with sleeve tube 24. The latter is evacuated first and can be filled according to the invention during operation by opening a first container 40 containing a protective gas. Both the evacuated annular space 26 and the annular space 26 that is filled with a protective gas have a reduced heat conduction, whereby heat losses are limited.

Figure 2:
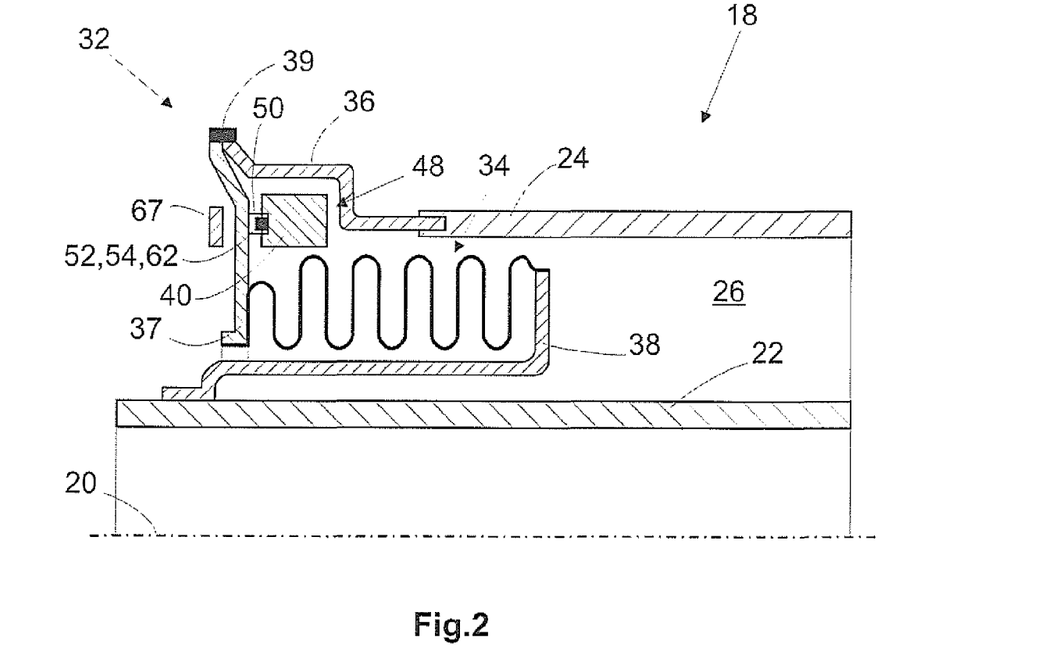
FIG. 2 shows a first example of embodiment of an absorber tube according to the invention in a half-sectional representation.

FIG. 2 shows a first example of embodiment of an absorber tube 18 according to the invention in a half-sectional representation. Absorber tube 18 has an expansion-equilibrating unit 32 for equilibrating the expansions of the sleeve tube and of the metal tube and for the gas-tight sealing of annular space 26 during the operation of solar collector 10.

The relative movements between sleeve tube 24 and metal tube 22 that arise as a consequence of the different expansions are equilibrated by means of an expansion bellows 34. The expansions of sleeve tube 24 in this case are transmitted to expansion bellows 34 by means of a transition element 36 and an outer ring 37, whereas the expansions of metal tube 22 are transmitted to expansion bellows 34 via a connection element 38. Outer ring 37 is joined to transition element 36 by means of a weld 39.

The absorber tube comprises a first container 40 filled with protective gas. The first container 40 is fastened to outer ring 37 via a retaining device 50 and has an outlet opening 52, which is closed with a closure material 54. For example, metal solder 62 can be used as a closure material 54, which can be fused upon heat activation, whereby outlet opening 52 is freed up and the protective gas is introduced into annular space 26. A noble gas such as argon or xenon or another inert gas, which is characterized by a small heat conductivity, can be used as the protective gas. The heat required for opening the closure material 54 can be generated, for example, by means of an opening unit 67. In this case, opening unit 67 can be any suitable device by means of which heat can be produced, for example a heat lamp or a soldering iron. The heat produced is conducted via retaining device 50 into first container 40 where it opens outlet opening 52.

Figure 3:
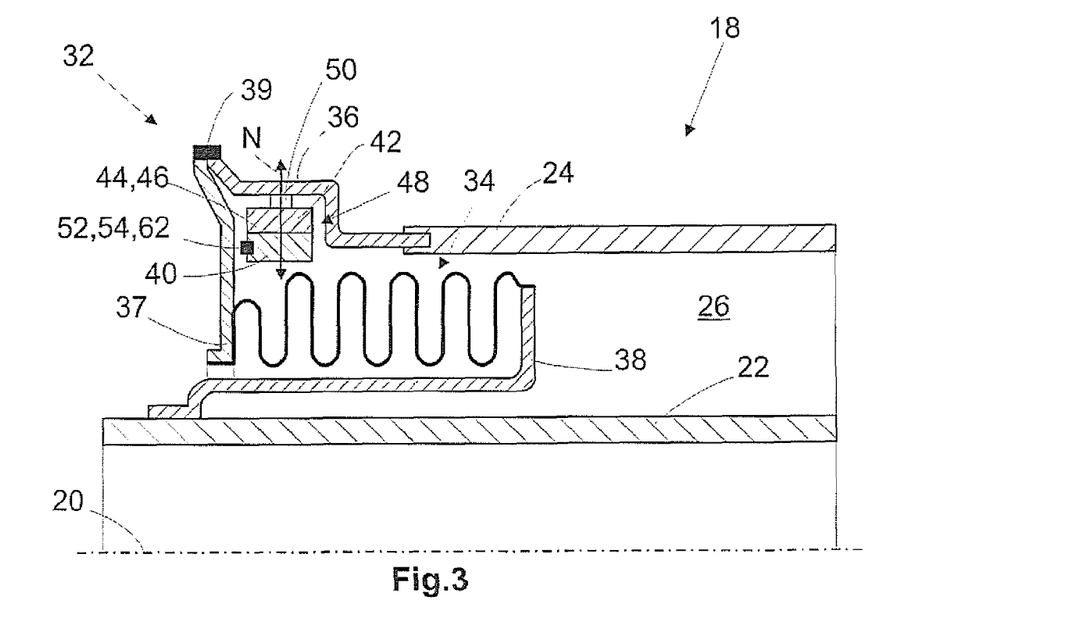
FIG. 3 shows a second example of embodiment of the absorber tube according to the invention in a half-sectional representation.

A second embodiment of absorber tube 18 according to the invention is shown in FIG. 3. In addition to first container 40, absorber tube 18 in this embodiment has a second container 42 filled with a getter material, both of which containers are found in annular space 26. First container 40 has a first surface 44 and second container 42 has a second surface 46, by means of which they can be joined together. Normal vectors N of the first and second surfaces 44, 46 in this case run perpendicular to longitudinal axis 20 of absorber tube 18.

In the example shown, both containers 40, 42 are designed as closed rings or hollow cylinders, first container 40 being inserted into second container 42, so that they form one component 48. Component 48 is joined with transition element 36 by means of a retaining device 50 above second container 42 and thus fixed in place in annular space 26. Alternatively, component 48 can be dimensioned so that it is applied to transition element 36 and is set in its position by friction and/or form-fitting, so that retaining device 50 is no longer required.

Figure 4:
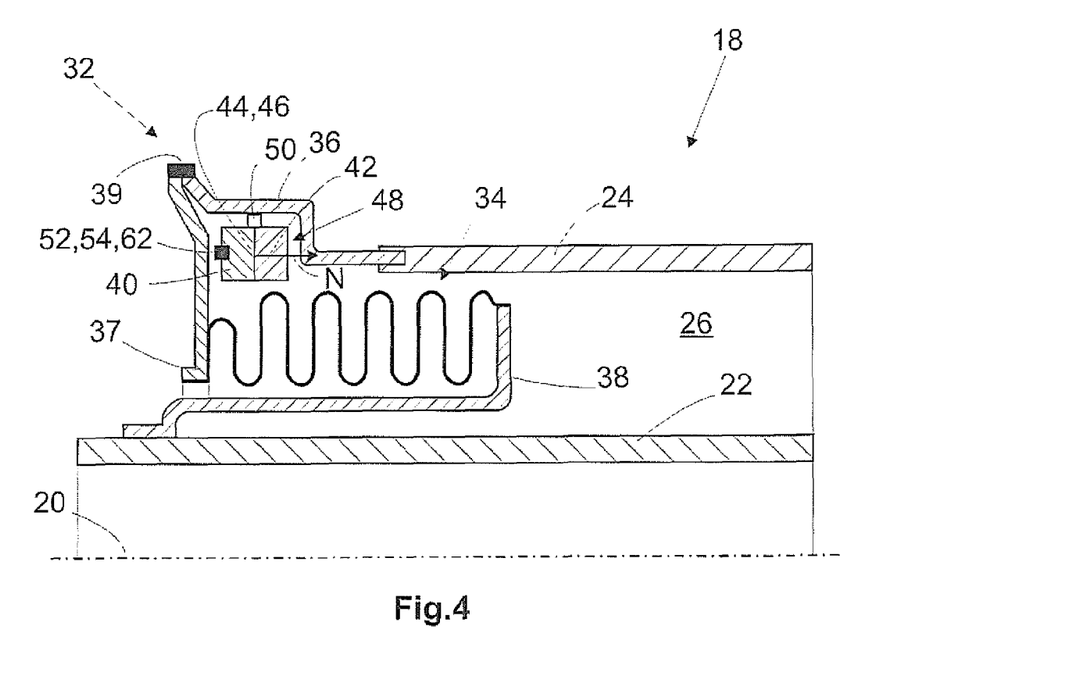
FIG. 4 shows a third example of embodiment of the absorber tube according to the invention in a sectional representation.

FIG. 4 shows a third example of embodiment of absorber tube 18 according to the invention in a half-sectional representation. It is distinguished from the first example of embodiment by the fact that normal vectors N of the first and the second surfaces 44, 46 run parallel to longitudinal axis 20 of absorber tube 18. Further, the two containers 40, 42 have the same dimensions and are disposed one behind the other, viewed along longitudinal axis 20.

Figure 5:
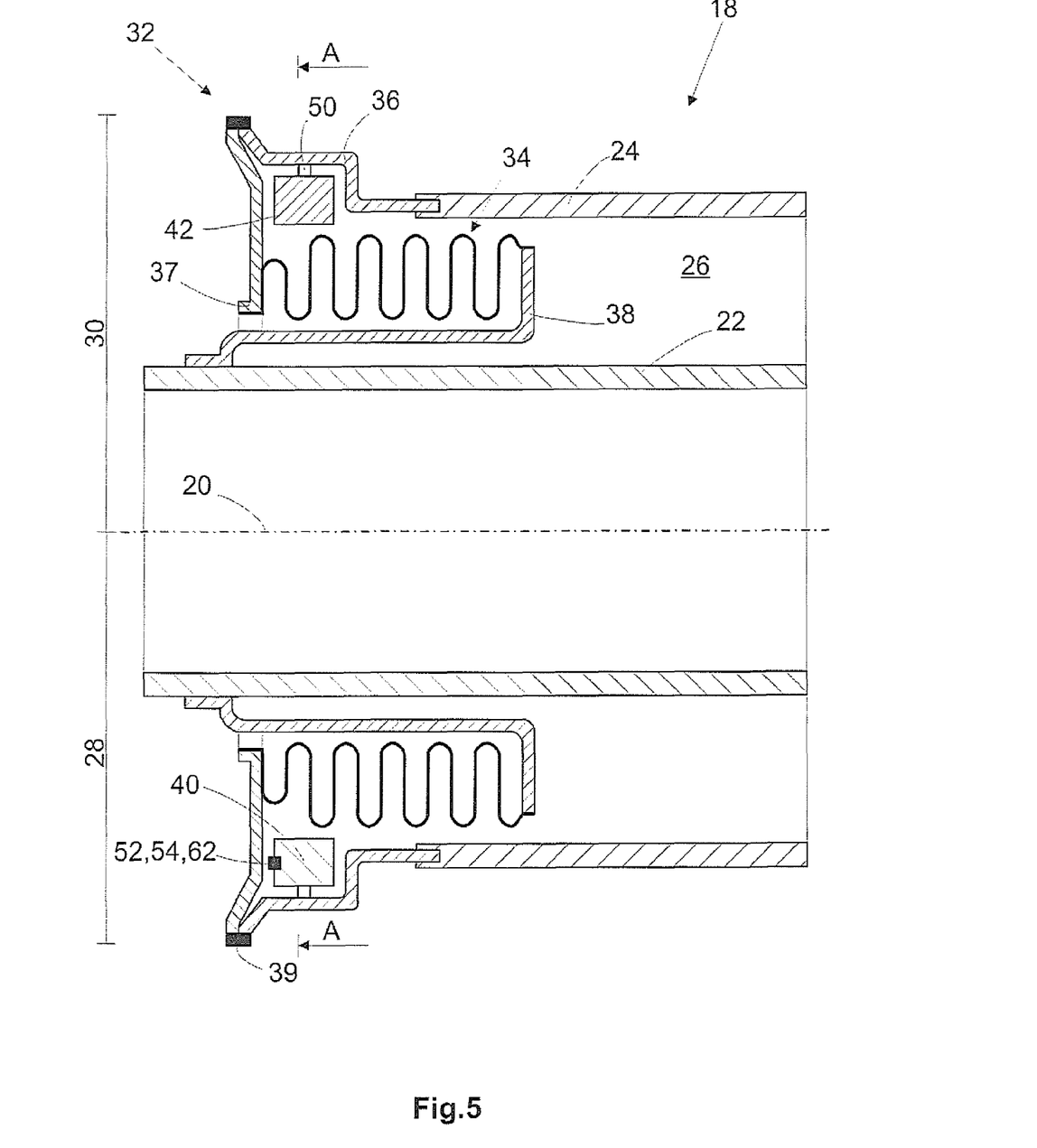
FIG. 5 shows a fourth example of embodiment of the absorber tube according to the invention in a half-sectional representation.

FIG. 5 shows a fourth example of embodiment of absorber tube 18 according to the invention in a sectional representation. Here, the two containers 40, 42 are designed as half rings 56 or half hollow cylinders with identical dimensions (see FIG. 10). Further, first container 40 is disposed in the half 28 of absorber tube 18 facing collector mirror 12 and second container 42 is disposed in the half 30 turned away from collector mirror 12.

Figure 6:
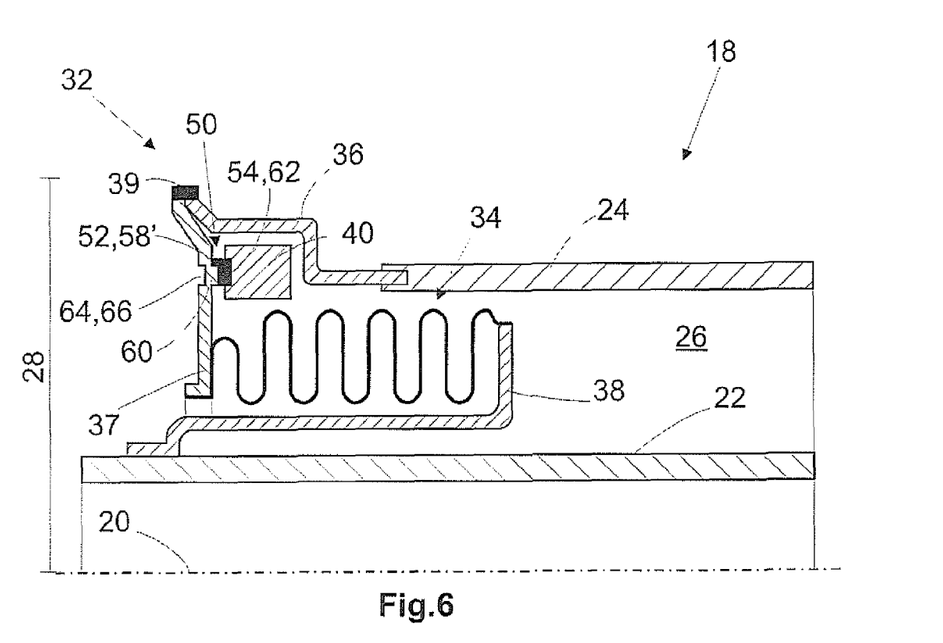
FIG. 6 shows a fifth example of embodiment of the absorber tube according to the invention in a half-sectional representation.

The fifth example of embodiment shown in FIG. 6 shows the half 28 of absorber tube 18 facing collector mirror 12 and in which is found first container 40. Deviating from the above-described examples of embodiment, retaining device 50 is executed as a solder point 58, with which first container 40 is fastened to outer ring 37. For this purpose, outer ring 37 has a projection 60, which projects into outlet opening 52.

A metal solder 62, which serves simultaneously for fastening first container 40 to outer ring 37, serves as closure material 54. Moreover, first container 40 is constructed like the container in the third example of embodiment and is also joined with second container 42 (not shown here; see FIG. 10). Overall, the first and the second containers 40, 42 in the example shown are joined to outer ring 37 by three solder points 58', 58'' and 58''' (see FIG. 10); of course, only solder point 58' simultaneously also closes outlet opening 52 of first container 40. In order to mark this solder point 58' and to indicate that the heat activation is to be produced at this site for freeing up outlet opening 52, outer ring 37 has a marking 64 at this site, provided here as recess 66. If solder point 58' is opened, first and second containers 40, 42 are still sufficiently fastened by solder points 58'' and 58''' (see FIG. 10).

Figure 7:
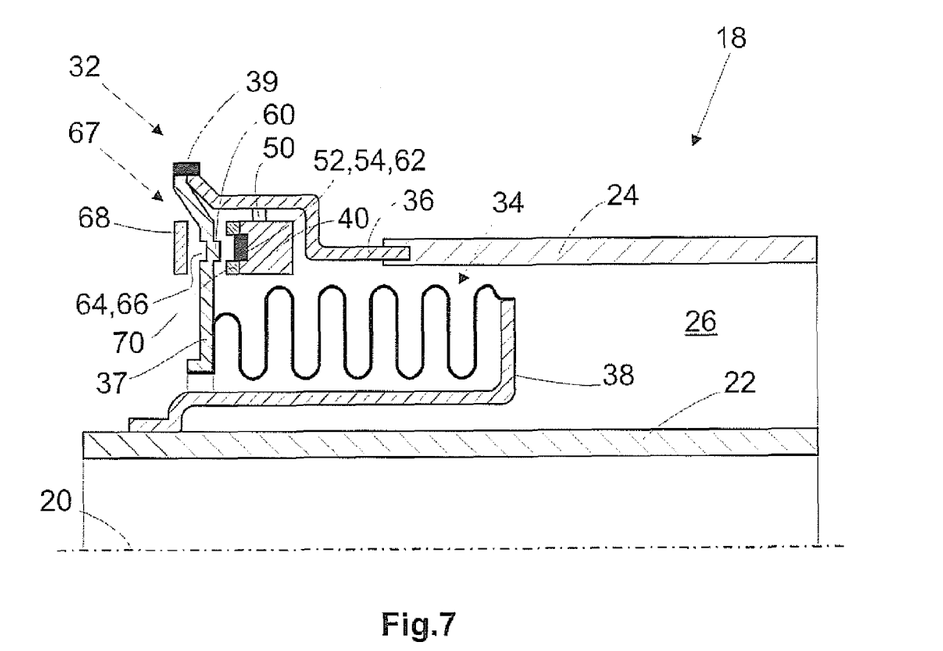
FIG. 7 shows a sixth example of embodiment of the absorber tube according to the invention in a half-sectional representation.

In the sixth example of embodiment, which is shown in FIG. 7, the first and the second (not shown) containers 40, 42 are fastened by retaining device 50 to transition element 36. Absorber tube 18 has an opening unit 67 for freeing up outlet openings 52, which comprises an electrical coil 68 disposed outside annular space 26, a metal disk or washer 70 and this coil inductively heats closure material 54, and outlet opening 52 can be opened. Here also, outer ring 37 can be provided with recess 66 for marking outlet opening 52, by means of which electrical coil 68 can be introduced in the correct position.

Figure 8:
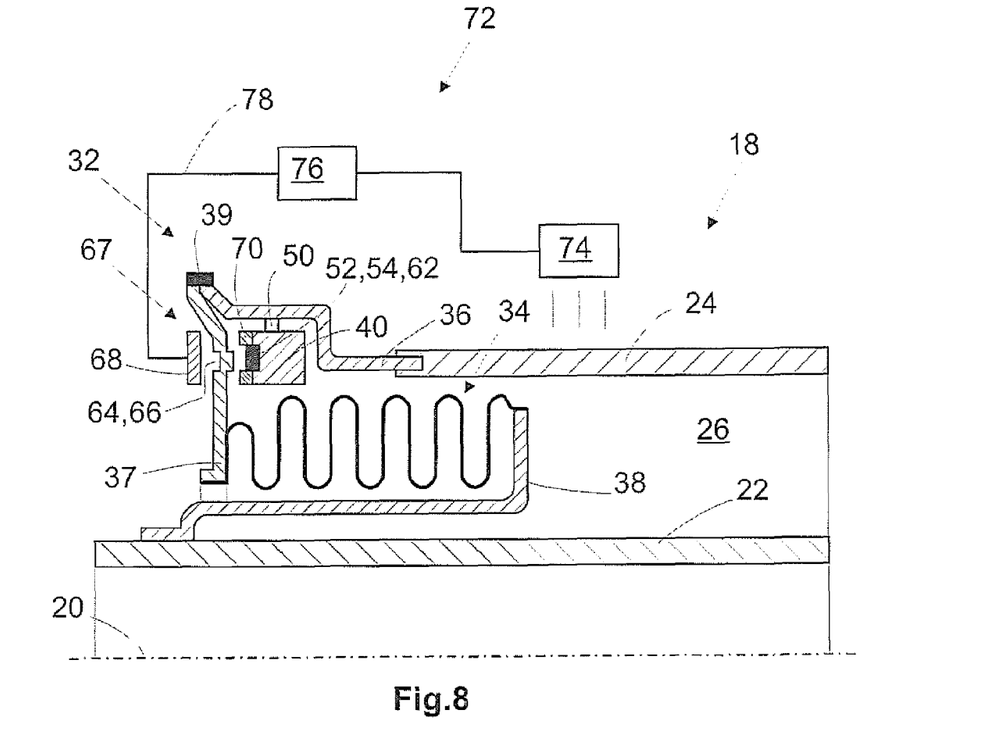
FIG. 8 shows a schematic representation of a device for introducing protective gas into an annular space of an absorber tube.

A device 72 for introducing protective gas into an annular space 26 of an absorber tube 18 is shown schematically in FIG. 8. Here, it comprises absorber tube 18, as it is shown in FIG. 7. It additionally comprises a temperature measuring unit 74 and a comparison unit 76, which are connected with one another and with electrical coil 68 of opening unit 67 via electrical cable 78. A connection without cable or a wireless connection is also conceivable. The temperature measuring unit 74 can be designed as a thermal imaging camera or as a temperature sensor and determines the temperature value of sleeve tube 24. This temperature value is transmitted to comparison unit 76, which can be designed as a computer. This computer compares the temperature value that has been determined with a selectable critical temperature value that can be input into comparison unit 76. If the temperature value that has been determined exceeds the critical temperature value, comparison unit 76 activates electrical coil 68 of opening unit 67, so that first container 40 is opened and protective gas is introduced into annular space 26 of absorber tube 18.

Figure 9:
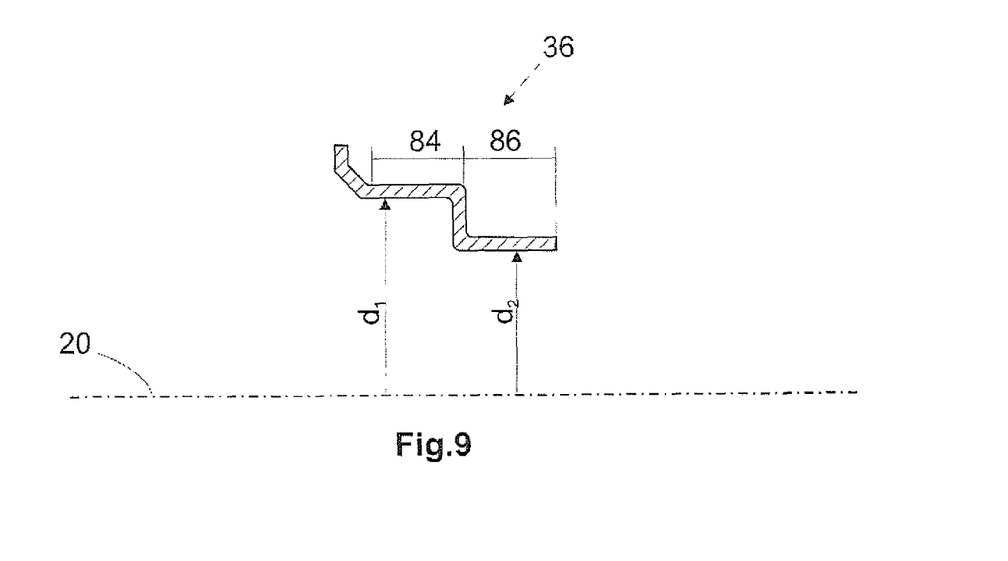
FIG. 9 shows an isolated representative of a transition element.

Transition element 36 is shown isolated in FIG. 9. It has a first region 84 with a first diameter $d_1$ and a second region 86 with a second diameter $d_2$. Due to this configuration of transition element 36, an increased stiffness will be achieved, in order to reduce the stresses on of the connection between transition element 36 and sleeve tube 24 as a consequence of the heat input both during the operation of solar collector 10 and also when welding transition element 36 to outer ring 37.

Figure 10:
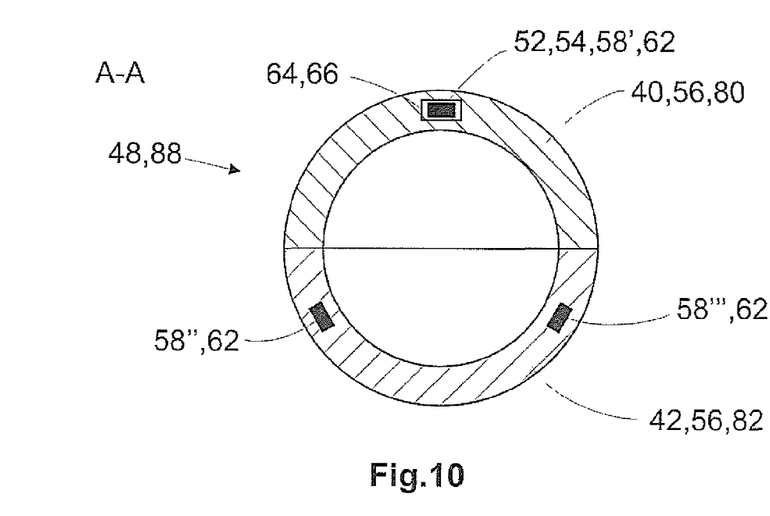
FIG. 10 shows a sectional representation through a first example of embodiment of a first container according to the invention and a second container according to the invention along the plane A-A defined in FIG. 5.
Figure 11:
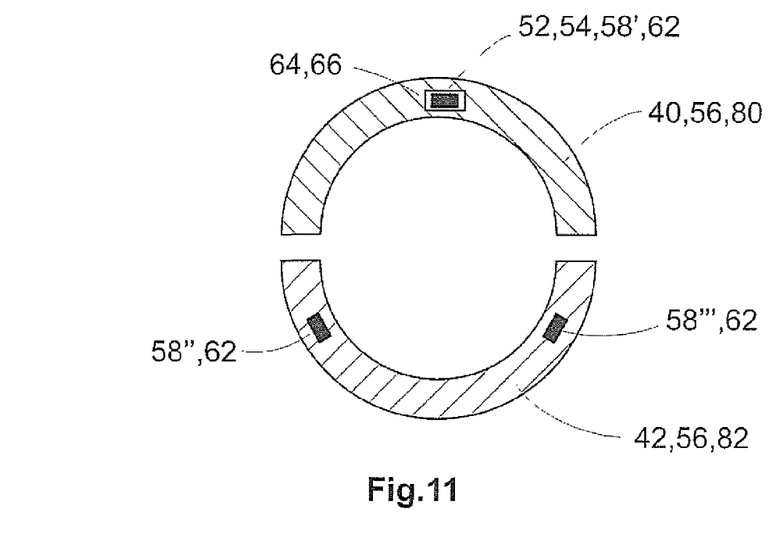
FIG. 11 shows a sectional representation through a second example of embodiment of a first container according to the invention and a second container according to the invention along the plane A-A defined in FIG. 5.

Different embodiment examples of the first and second containers 40, 42 are shown in cross section in FIGS. 10 and 11, along cutting plane A-A defined in FIG. 5. The cross section of the two containers 40, 42 can be circular or polygonal along the cutting planes of FIGS. 2 to 7. First container 40 designed as a first ring segment 80 and second container 42 designed as a second ring segment 82 here in FIG. 10 are shown as two half rings 56 of equal size that together form a closed ring 88. Other embodiments are also conceivable, for example, such that first ring segment 80 is formed as a quarter ring and second ring segment 82 is configured as a three-quarter ring. A division into more than two containers or more than two ring segments is also possible.

Shown in FIG. 11 is the case when in fact first container 40 and second container 42 are each formed as half rings 56 and form first ring segment 80 and second ring segment 82, but are not joined together. Each of them must then be fixed in place individually in annular space 26.

The invention has been described in detail on the basis of several preferred embodiment examples. Modifications or variations resulting in an obvious way from the description for a person skilled in the art do not deviate from the concept that is the basis for the invention and are contained within the protective scope, which is defined by the following claims.

LIST OF REFERENCE CHARACTERS

10 Solar collector
12 Collector mirror
14 Solar irradiation
16 Reflected solar irradiation
18 Absorber tube
20 Longitudinal axis
22 Metal tube
24 Sleeve tube
26 Annular space
28 Half of the absorber tube facing the collector mirror
30 Half of the absorber tube turned away from the collector mirror
32 Expansion-equilibrating unit
34 Expansion bellows
36 Transition element
37 Outer ring
38 Connection element
39 Weld
40 First container
42 Second container
44 First surface
46 Second surface
48 Component
50 Retaining device
52 Outlet opening
54 Closure material
56 Half ring
58 Solder point
60 Projection
62 Metal solder
64 Marking
66 Recess
67 Opening unit
68 Electrical coil
70 Metal disk or washer
72 Device for introducing protective gas into an annular space of an absorber tube
74 Temperature measuring unit
76 Comparison unit
78 Cable
80 First ring segment
82 Second ring segment 84 First region
86 Second region
88 Closed ring
$d_1$ First diameter
$d_2$ Second diameter
N Normal vector

The invention claimed is:

1. An absorber tube for a solar collector, comprising:
a metal tube for conducting and heating a heat transfer medium;
a sleeve tube enclosing the metal tube and forming an annular space that can be evacuated;
a first container in the annular space and filled with protective gas, the first container having an outlet opening closed by a closure material, the closure material opening the outlet opening upon external activation by an opening unit to introduce the protective gas into the annular space; and
an outer ring and a transition element that enclose the metal tube to seal the annular space, the first container being fixed in place in the annular space by a retaining device, the retaining device being disposed on the outer ring and/or on the transition element,
wherein the retaining device comprises one or more solder points of metal solder and the closure material comprises metal solder, at least one of the solder points also closing the outlet opening in order to fix the first container in the annular space.

2. An absorber tube for a solar collector, comprising:
a metal tube for conducting and heating a heat transfer medium;
a sleeve tube enclosing the metal tube and forming an annular space that can be evacuated;
a first container in the annular space and filled with protective gas, the first container having an outlet opening closed by a closure material, the closure material opening the outlet opening upon external activation by an opening unit to introduce the protective gas into the annular space;
an outer ring and a transition element that enclose the metal tube to seal the annular space, the first container being fixed in place in the annular space by a retaining device, the retaining device being disposed on the outer ring and/or on the transition element; and
a second container filled with a getter material for binding free hydrogen and disposed in the annular space, the second container being fixed in place in the annular space by the retaining device.

3. The absorber tube according to claim 2, wherein the external activation is heat activation.

4. The absorber tube according to claim 3, wherein the opening unit comprises an electrical coil and a metal disk or washer and the outlet opening can be heated inductively to provide the heat activation.

5. The absorber tube according to claim 2, wherein the retaining device comprises one or more solder points of metal solder.

6. The absorber tube according to claim 5, wherein the closure material comprises metal solder.

7. The absorber tube according to claim 6, wherein at least one of the solder points also closes the outlet opening in order to fix the first container in the annular space.

8. The absorber tube according to claim 2, wherein the outer ring has one or more projections projecting into the annular space for positioning the first and/or second container.

9. The absorber tube according to claim 8, wherein one of the one or more projections projects into the outlet opening of the first container and is provided with a marking for identifying the outlet opening.

10. The absorber tube according to claim 2, wherein the first and second containers are annular and enclose the metal tube.

11. The absorber tube according to claim 10, wherein the first container has a first surface and the second container has a second surface by which the first and second containers are connected into one component.

12. The absorber tube according to claim 11, wherein the first and second surfaces extend radially to a longitudinal axis of the absorber tube.

13. The absorber tube according to claim 11, wherein the first and second surfaces run parallel to a longitudinal axis of the absorber tube.

14. The absorber tube according to claim 10, wherein the first container is a first ring segment and the second container is a second ring segment that are joined together to form a closed ring.

15. The absorber tube according to claim 10, wherein the first container has one or more first ring segments and the second container has one or more second ring segments, wherein the first and second ring segments are fixed in place separately from one another in the annular space.

16. The absorber tube according to claim 15, wherein the first and second ring segments are configured as half rings.

17. The absorber tube according to claim 2, further comprising a first half that faces a collector mirror of the solar collector and a second half turned away from the collector mirror, wherein the second container is in the second half.

18. The absorber tube according to claim 2, wherein the transition element has a first region with a first diameter and a second region with a second diameter, the first and second diameters reducing heat expansion.

19. The absorber tube according to claim 2, wherein the outer ring is stainless steel and the transition element is kovar.

20. A solar collector comprising the absorber tube of claim 2 and a collection mirror.

21. The solar collector of claim 20, further comprising a device for introducing the protective gas into the annular space.

* * * * *